(12) United States Patent
Graham

(10) Patent No.: US 9,524,804 B2
(45) Date of Patent: Dec. 20, 2016

(54) CONTROL ROOM FOR NUCLEAR POWER PLANT

(71) Applicant: Babcock & Wilcox mPower, Inc., Charlotte, NC (US)

(72) Inventor: Thomas G Graham, Lynchburg, VA (US)

(73) Assignee: BWXT mPower, Inc., Charlotte, NC (US)

(*) Notice: Subject to any disclaimer, the term of this patent is extended or adjusted under 35 U.S.C. 154(b) by 566 days.

(21) Appl. No.: 13/860,903

(22) Filed: Apr. 11, 2013

(65) Prior Publication Data

US 2014/0133618 A1 May 15, 2014

Related U.S. Application Data

(60) Provisional application No. 61/625,457, filed on Apr. 17, 2012, provisional application No. 61/625,895, filed on Apr. 18, 2012.

(51) Int. Cl.
*G21D 3/00* (2006.01)
*G21D 3/08* (2006.01)
*G21C 1/32* (2006.01)

(52) U.S. Cl.
CPC ............... *G21D 3/008* (2013.01); *G21C 1/32* (2013.01); *G21D 3/08* (2013.01); *Y02E 30/40* (2013.01)

(58) Field of Classification Search
CPC .................................................... G21D 3/008
(Continued)

(56) References Cited

U.S. PATENT DOCUMENTS 3,366,415 A 1/1968 Cooper
D247,183 S 2/1978 Cosentino
(Continued)

FOREIGN PATENT DOCUMENTS

GB 2286907 8/1995
KR 20010076719 8/2001
(Continued)

OTHER PUBLICATIONS

IAEA-TECDOC-565, "Control Rooms and Man-Machine Interface in Nuclear Power Plants", 1990.*
(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A control room for a nuclear power plant including two or more nuclear reactor units includes a central workstation providing monitoring capability for both nuclear reactor units, a first operator at the controls (OATC) workstation in front of and to one side of the central workstation providing monitoring and control capabilities for the first nuclear reactor unit, a second OATC workstation in front of and to the other side of the central workstation providing monitoring and control capabilities for the second nuclear reactor unit, and a common control workstation directly in front of the central workstation providing monitoring and control capabilities for systems serving both the first nuclear reactor unit and the second nuclear reactor unit. The central and common control workstations do not provide control capabilities for either nuclear reactor unit. The common control workstation does not include any control capabilities that must be performed by a licensed operator.

11 Claims, 7 Drawing Sheets

(58) Field of Classification Search
USPC .................................. 376/207, 216, 259
See application file for complete search history.

(56) References Cited

U.S. PATENT DOCUMENTS

| | | | |
|---|---|---|---|
| 5,227,121 | A | 7/1993 | Scarola et al. |
| 5,263,061 | A * | 11/1993 | Lamuro ................. G21D 3/00 376/260 |
| 5,271,045 | A | 12/1993 | Scarola et al. |
| 5,287,666 | A | 2/1994 | Frascaroli et al. |
| 5,906,079 | A | 5/1999 | Brickner et al. |
| 6,067,762 | A | 5/2000 | Greer et al. |
| 6,076,308 | A | 6/2000 | Lyon et al. |
| 6,163,740 | A | 12/2000 | Beltracchi |
| 6,276,102 | B1 | 8/2001 | Shipman et al. |
| 6,374,548 | B1 | 4/2002 | Ruedinger et al. |
| 6,415,555 | B1 | 7/2002 | Montague |
| 6,492,901 | B1 | 12/2002 | Ridolfo |
| 6,663,267 | B2 | 12/2003 | Newhouse et al. |
| D694,427 | S | 11/2013 | Edkert et al. |
| 8,776,445 | B1 | 7/2014 | Jhaveri et al. |
| 8,776,446 | B1 | 7/2014 | Jhaveri et al. |
| 2002/0011193 | A1 | 1/2002 | Beck et al. |
| 2002/0026755 | A1 | 3/2002 | Jones |
| 2003/0117440 | A1 | 6/2003 | Hellyar et al. |
| 2004/0082334 | A1 | 4/2004 | Petrick et al. |
| 2004/0103593 | A1 | 6/2004 | Beasley |
| 2008/0035031 | A1 | 2/2008 | Yamanishi et al. |
| 2008/0104571 | A1 | 5/2008 | Jaeger |
| 2009/0000789 | A1 | 1/2009 | Leuthen et al. |
| 2009/0031181 | A1 | 1/2009 | Yuan et al. |
| 2009/0090076 | A1 | 4/2009 | Abusada et al. |
| 2009/0129530 | A1 | 5/2009 | Reyes, Jr. et al. |
| 2009/0217084 | A1 | 8/2009 | Ebbert et al. |
| 2009/0293388 | A1 | 12/2009 | Feldpausch et al. |
| 2010/0024688 | A1 | 2/2010 | Kitada et al. |
| 2010/0141421 | A1 | 6/2010 | Lagnelov et al. |
| 2010/0188263 | A1 | 7/2010 | Cornwall et al. |
| 2011/0126111 | A1 | 5/2011 | Gill et al. |
| 2011/0200158 | A1 | 8/2011 | Hyde et al. |
| 2012/0305203 | A1 | 12/2012 | Verbeek et al. |
| 2012/0311946 | A1 | 12/2012 | Liu et al. |
| 2013/0129030 | A1 * | 5/2013 | Hanada ................. G21D 3/008 376/259 |
| 2014/0116299 | A1 | 5/2014 | Salehi et al. |
| 2014/0261100 | A1 | 9/2014 | Henriott et al. |
| 2014/0285720 | A1 | 9/2014 | Epstein et al. |

FOREIGN PATENT DOCUMENTS

| | | |
|---|---|---|
| WO | 9106960 | 5/1991 |
| WO | 2011103652 | 9/2011 |

OTHER PUBLICATIONS

Berg, "Small Modular Reactors, Generation III+ and IV", 2013.*
U.S. Congress Office of Technology Assessment, "Case Study: Nuclear Power Plant Control Room Operators", 1991, US GPO, pp. 142-152.*
Webster, "Candu 9 Control Centre Mockup", 1996.*
Travers, NRC Policy Issue, SECY-01-0207, Nov. 2011.*
Testa, "The Westinghouse Pressurized Water Reactor Nuclear Power Plant", 1984, pp. 126-133.*
Naser, "Human Factors Guidance for Control Room and Digital Human-System Interface Design and Modification", EPRI 1008122, Nov. 2004, section 4.8.6, pp. 4-472 to 4-474.*
NEI, "Control Room Staffing for Small Reactors", Sep. 2011.*
Malcolm, "Human Machine Interface Design in New CANDU Control Centres", IEEE 1993, pp. 91-95.*
AECL, "Status Report 69—Advanced Candu Reactor 1000 (ACR-1000)", Apr. 2001, 31 pages.*
Gaio, "AP1000 The PWR Revisited", IAEA-CN-164-3S05, Oct. 2009.*
IAEA-TECDOC-812, "Control Room Systems Design for Nuclear Power Plants", ISSN 1011-4289, Jul. 1995.*
Naser, "Nuclear Power Plant Control Room Modernization Planning", EPRI 1003569, 116 pages, Oct. 2008.*
The International Search Report and the Written Opinion for PCT/US2013/036303, dated Oct. 7, 2013.
NEI, Control Room Staffing for Small Reactors, Sep. 23, 2011.
GE Hitachi Nuclear Energy, ANS 2010 Winter Meeting & Embedded Topical Meetings, PDW #1: Digital Instrumentation & Controls Workshop, Vendor Perspectives—GE Hitachi, by Richard E. Miller, Nov. 7, 2010.
2010 ANS Winter Meeting: "Nuclear Process!"; 7th Int'l Topical Meeting on Nuclear Plant Implementation, Control and Human Machine Interface Technologies (NPIC&HMIT 2010), New and Existing Plants I&C Design, Digital Instrumentation and Control Workshop, Las Vegas, NV, Nov. 7, 2010, by Sergey S. Anikanov, PhD, Westinghouse Electric Co.
John O. Hara et al: BNL-96809-2012 NRC Reviewer Aid for Evaluating the Human Factors Engineering Aspects of Small Modular Reactors. Jan. 13, 2012.
Seong Soo Choi et al: "Development Strategies of an Intelligent Human-Machine Interface for Next Generation Nuclear Power Plants", IEEE Transactions on Nuclear Science, IEEE Service Center, New York, NY US, vol. 43, No. 3, Jun. 1, 1996.
Extended European Search Report dated Oct. 30, 2015 for European Application No. 13777984.9.
Wood, John. Chapter 9—Control Room Design (pp. 203-233), in Human Factors for Engineers (Sandom, Carl II, Harvey, Roger, 1st ed. 2004).
Office Action dated Apr. 5, 2016 for Chinese Application No. 201380031775.9.

* cited by examiner

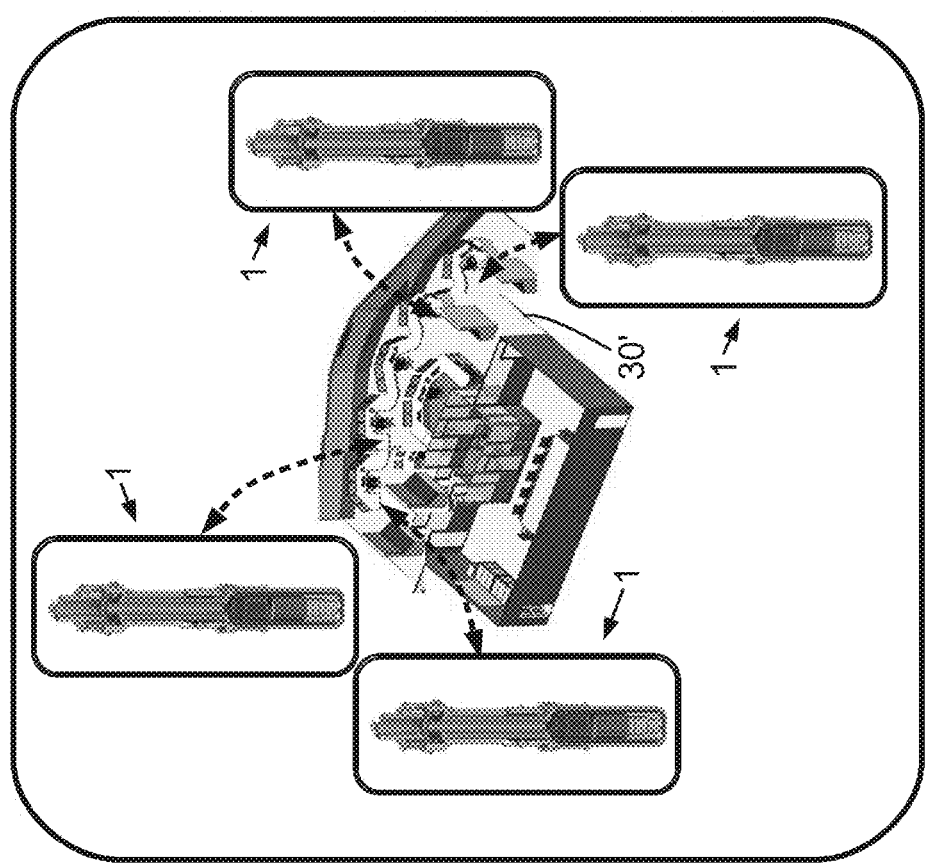

CONTROL ROOM FOR NUCLEAR POWER PLANT

This application claims the benefit of U.S. Provisional Application No. 61/625,457, filed Apr. 17, 2012, titled "INSTRUMENTATION AND CONTROL (I&C) ARCHITECTURE AND MAIN CONTROL ROOM FOR CONTROLLING A NUCLEAR REACTOR FACILITY". This application claims the benefit of U.S. Provisional Application No. 61/625,895, filed Apr. 18, 2012, titled "MAIN CONTROL ROOM FOR A NUCLEAR POWER PLANT WITH TWO REACTOR UNITS".

U.S. Provisional Application No. 61/625,457, filed Apr. 17, 2012, is hereby incorporated by reference in its entirety into the specification of this application. U.S. Provisional Application No. 61/625,895, filed Apr. 18, 2012, is hereby incorporated by reference in its entirety into the specification of this application.

BACKGROUND

The following relates to the nuclear reactor arts, nuclear power generation arts, nuclear reactor control arts, nuclear reactor human-machine interface (HMI) arts, nuclear reactor control arts, and related arts.

The human-machine interface (HMI) and control systems of a nuclear power plant should be ergonomic to reduce likelihood of human operator error. These systems should also be designed to minimize likelihood of mechanical or electronic failure, and to be defensible against physical assault. While computer-based control systems have advantages, the use of computer systems is balanced against disadvantages including intangibility and the potential for malicious cyber-assault.

In existing nuclear power plants, these design constraints are accommodated by providing a control room for the nuclear power plant. An operator at the controls (OATC) deployed in the central control room is responsible for all aspects of operation of the nuclear island, which houses the nuclear reactor unit which includes the pressure vessel containing the nuclear reactor core comprising fissile material (e.g. $^{235}$U) immersed in primary coolant water and ancillary components such as a pressurizer, reactor coolant pumps (RCPs), and a control rod drive system including control rods operated by control rod drive mechanisms (CRDMS). In the case of a boiling water reactor (BWR), primary coolant is directly boiled to generate steam for operating the plant turbine. In a pressurized water reactor (PWR), primary coolant in liquid form flows through a steam generator to boil secondary coolant so as to generate the operating steam. The steam generator may be located external to the reactor unit, or inside the pressure vessel of the reactor unit (called an "integral PWR"). The nuclear reactor unit and external steam generator (if present) are housed in a radiological containment structure, usually made of steel or steel-reinforced concrete, and a reactor service building houses both the containment structure and the control room. Alternatively, the control room may be in a separate building located close to (e.g. adjacent) the reactor service building.

From the control room, the OATC has operational control of all safety and non-safety systems related to operating the nuclear reactor unit. These include (by way of illustrative example): reactor pressure and temperature control systems (e.g., CRDMs, pressurizer, et cetera); the emergency core cooling system; various water systems (e.g. component cooling water servicing pumps and other water-cooled components, circulating water servicing a condenser downstream of the turbine, a reactor coolant inventory/purification system); the steam turbine control system, the electrical generator control system, and electrical power distribution systems. Some of these components, such as the electrical generator, are not actually part of the nuclear island, but their operation is critical to safe operation of the nuclear island and hence are under control of the OATC.

Until recently, analog reactor control systems were predominantly used. Analog systems advantageously provide hard-wired connections and tangible switches, buttons, dials, annunciator lights, and other tangible user interface elements, and are impervious to cyber attack. The tangible nature of the analog control components facilitates diagnosis of any control system failure. The threat of malicious physical tampering is mitigated by locating the control room in the reactor service building with the nuclear reactor unit, which reduces cable run lengths. Digital, i.e. computer-based control systems are increasingly being used. In such cases, the digital communication systems are generally on an isolated digital data network (e.g., not connected with the Internet or to any local area network employed for general plant business operations, so as to mitigate the threat of cyber attack). The digital data network is typically a hard-wired network so as to enhance tangibility, although the use of wireless communication is contemplated. Some regulatory jurisdictions require an analog system backing up any digital control systems.

The nuclear power plant includes numerous other control systems that are unrelated to, or tangentially related to, safe operation of the nuclear island. These include, by way of illustrative example: electrical switchyard interfacing with the external power grid; utility system such as demineralized water (DW); water makeup systems; environmental monitoring; fire detection systems; and so forth. The impact of these systems on safe operation of the nuclear island is delayed or nonexistent. Some of these non-safety systems may be under control of the OATC inside the control room, while others may be under control of other plant personnel located elsewhere.

Overall coordination of plant operations is generally under the control of a Senior (or Supervisory) Reactor Operator (SRO), who provides on-site interfacing between the OATC, other plant operators, and entities outside the nuclear power plant (e.g., external electrical, water, and other utilities, the general public, and so forth). In this supervisory role, the SRO is typically located in a business-style office, and communicates with the OATC and other plant operators via telephone, although the SRO may be mobile and, for example, go to the control room when appropriate.

In the United States and most other jurisdictions, plant control is regulated, e.g. by the Nuclear Regulatory Commission (NRC) in the United States. In the NRC regulatory framework, the OATC and the SRO must be licensed by the NRC to operate the specific nuclear power plant at which they are employed. In practice, several OATCs, as well as the SRO, are required to be on-site at all times, and all licensed operators are required to partake in ongoing training including simulation time. The nuclear power plant must therefore employ several dozen OATCs in order to have sufficient capacity for full-time 24-hour operation.

Some nuclear power plants include two or more nuclear reactor units. In such cases, each nuclear power plant has its own control room with cabling between the control room and the controlled nuclear reactor unit, and each reactor unit is serviced by its own ancillary water, electrical, and other utility systems. Each reactor unit has its own SRO, and there may be a managing SRO overseeing all nuclear reactor units of the power plant.

Disclosed herein are improvements that provide various benefits that will become apparent to the skilled artisan upon reading the following.

BRIEF SUMMARY

In accordance with one aspect, a control room is disclosed for monitoring and controlling a nuclear power plant including a first nuclear reactor unit and a second nuclear reactor unit. The control room comprises: a central workstation providing monitoring capability for both the first nuclear reactor unit and the second nuclear reactor unit; a first operator at the controls (OATC) workstation in front of and to one side of the central workstation providing monitoring and control capabilities for the first nuclear reactor unit but not for the second nuclear reactor unit; and a second OATC workstation in front of and to the other side of the central workstation providing monitoring and control capabilities for the second nuclear reactor unit but not for the first nuclear reactor unit. The central workstation, the first OATC workstation, and the second OATC workstation are disposed in the control room. In some embodiments the central workstation does not provide control capabilities for the first nuclear reactor unit and does not provide control capabilities for the second nuclear reactor unit.

In accordance with another aspect, a nuclear power plant includes a first nuclear reactor unit including a nuclear reactor core comprising fissile material disposed in a pressure vessel, a second nuclear reactor unit including a nuclear reactor core comprising fissile material disposed in a pressure vessel; and a control room as set forth in the immediately preceding paragraph.

In accordance with another aspect, a control room is disclosed for monitoring and controlling a nuclear power plant including a first nuclear reactor unit and a second nuclear reactor unit. The control room comprises: a central workstation providing monitoring capability for both the first nuclear reactor unit and the second nuclear reactor unit; a first operator at the controls (OATC) workstation providing monitoring and control capabilities for the first nuclear reactor unit but not for the second nuclear reactor unit; a second OATC workstation providing monitoring and control capabilities for the second nuclear reactor unit but not for the first nuclear reactor unit; and a common control workstation providing monitoring and control capabilities for systems serving both the first nuclear reactor unit and the second nuclear reactor unit. The central workstation, the first OATC workstation, the second OATC workstation, and the common control workstation are disposed in the control room.

In accordance with another aspect, a control room is disclosed for monitoring and controlling a nuclear power plant including one or more nuclear reactor units. The control room comprises: a central workstation providing monitoring capability for the one or more nuclear reactor units; one or more operator at the controls (OATC) workstations, each OATC workstation providing monitoring and control capabilities for a corresponding one of the one or more nuclear reactor units; and a non-safety control workstation providing monitoring and control capabilities for non-safety systems servicing the one or more nuclear reactor units wherein a failure of any non-safety system controlled by the non-safety control workstation does not require intervention of an OATC for at least a minimum time interval $T_{CC}$. The central workstation, the one or more OATC workstations, and the non-safety control workstation are disposed in the control room. In some embodiments $T_{CC}$ has a value greater than or equal to one hour.

In accordance with another aspect, a control room as set forth in either one of the two immediately preceding paragraphs further includes a data network providing: one-way communication from each OATC workstation to the common or non-safety control workstation; one-way communication from each OATC workstation to the central workstation; bidirectional communication between each OATC workstation and its corresponding nuclear reactor unit; and no communication between the common or non-safety control workstation and any of the one or more nuclear reactor units. In some embodiments the data network provides no communication between the central workstation and any of the one or more nuclear reactor units. In some embodiments the control room further includes: one or more manual safety panels (MSPs) corresponding to the one or more nuclear reactor units, each MSP being in bidirectional analog communication with its corresponding nuclear reactor unit; wherein the MSPs are disposed with the central workstation, the one or more OATC workstations, and the common or non-safety control workstation in the control room.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 6 and 7 diagrammatically show extension of the "two-pack" nuclear power plant of FIG. 1 to a "four-pack" nuclear power plant including four nuclear reactor units.

DETAILED DESCRIPTION OF THE PREFERRED EMBODIMENTS

Disclosed herein are improved control room embodiments that are designed to be operated by a reduced number of licensed operators (as few as three licensed operators for a nuclear reactor unit, in some embodiments). The disclosed control room embodiments also enhance communication between licensed operators at the controls (OATCs), the Supervisory (or Senior) Reactor Operator (SRO), and other plant operators. As used herein, the OATC is a licensed operator that is licensed by the NRC (or the governing nuclear regulatory agency of the applicable jurisdiction) to operate the nuclear reactor unit under control of the OATC. The SRO is also a licensed operator, and also meets any other regulatory requirements for serving as a Supervisory (or Senior) Reactor Operator. All other plant operators may be licensed or unlicensed. An unlicensed plant operators is sometimes referred to herein as a "Non-licensed Reactor Operator" (NRO). It is to be understood that these operators may have various titles in various jurisdictions and/or at various nuclear power plants. The disclosed control room embodiments are scalable to nuclear power plants with one, two, or more nuclear reactor units.

Figure 1:
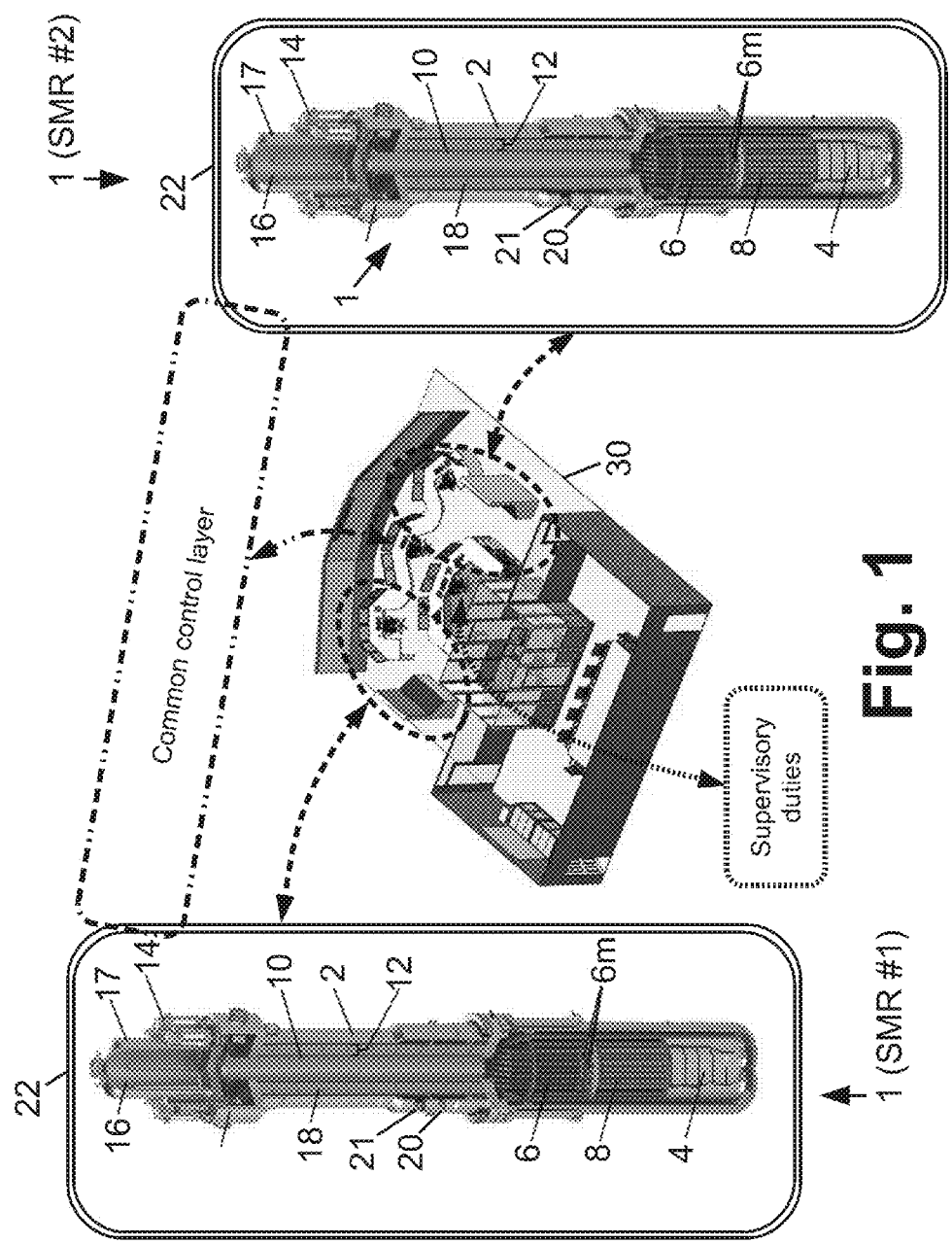
FIG. 1 diagrammatically shows a nuclear power plant including two nuclear reactor units and a control room providing monitoring and control for both nuclear reactor units.

With reference to FIG. 1, a nuclear power plant with two nuclear reactor units 1 is shown, which in the illustrative embodiment are small modular reactor (SMR) units. An SMR is typically considered to be a nuclear reactor unit having an electrical power output of 300-500 MWe or lower. The illustrative configuration with two reactor units 1 is sometimes referred to a as a "twin-pack". Where it is useful to distinguish between the two reactor control units 1, they are referred to herein as "SMR #1" (the left-hand unit 1 shown in FIG. 1) and "SMR #2" (the right-hand unit 1 shown in FIG. 1). Each of the illustrative reactor units 1 (shown in perspective view in partial section) is SMR of the pressurized water reactor (PWR) type, and includes a pressure vessel 2 comprising an upper vessel and a lower vessel joined by a mid-flange. The pressure vessel 2 houses a nuclear reactor core 4 comprising fissile material, e.g. $^{235}$U immersed in primary coolant water. Reactivity control is provided by a control rods system that includes control rod drive mechanisms (CRDMs) 6 and control rod guide frame supports 8. The illustrative CRDMs 6 are internal CRDMs disposed inside the pressure vessel and including CRDM motors 6m disposed inside the pressure vessel; however, external CRDMs with motors mounted above the pressure vessel and connected via tubular pressure boundary extensions are also contemplated. The pressure vessel 2 of the operating PWR contains circulating primary coolant water that flows upward through the nuclear reactor core 4 and through a cylindrical central riser 10, discharges at the top of the central riser 10 and flows back downward through a downcomer annulus 12 defined between the pressure vessel and the central riser to complete the primary coolant circuit. In the illustrative PWR, primary coolant circulation is driven by reactor coolant pumps (RCPs) 14 which may be located where illustrated in FIG. 1 or elsewhere (including a contemplated variant employing internal RCPs located inside the pressure vessel); moreover, natural circulation or the use of internal RCPs disposed inside the pressure vessel is also contemplated. Pressure inside the pressure vessel of the illustrative PWR is maintained by heating or cooling a steam bubble disposed in an integral pressurizer volume 16 of an integral pressurizer 17; alternatively, an external pressurizer can be connected with the pressure vessel by piping. Each illustrative PWR 1 is an integral PWR in which a steam generator (or plurality of steam generators) 18 is disposed inside the pressure vessel 2, and specifically in the downcomer annulus 12 in the illustrative PWR; alternatively, an external steam generator can be employed. In the illustrative integral PWR, secondary coolant in the form of feedwater is input to the steam generator 18 via a feedwater inlet 20, and secondary coolant in the form of generated steam exits via a steam outlet 21. In the alternative case of an external steam generator, the ports 20, 21 would be replaced by primary coolant inlet and outlet ports feeding the external steam generator. Each PWR 1 is disposed inside its own primary containment 22, which is suitably a steel structure, steel-reinforced concrete structure, or the like. (Thus, there are two separate primary containment structures 22 in the illustrative two-pack nuclear power plant).

It is to be understood that the illustrative nuclear power plant of FIG. 1 is an illustrative example. The disclosed nuclear power plant control room designs are suitably employed in conjunction with various nuclear reactor units, such as an integral PWR (as illustrated), or with a PWR employing an external generator (typically housed inside the main containment), or with a boiling water reactor (BWR) that does not include a steam generator. Although the illustrative plant of FIG. 1 is a two-pack, illustrative four-pack embodiments are also described herein, and it is to be understood that the disclosed control room embodiments are suitably used in conjunction with a nuclear power plant having one nuclear reactor unit, two nuclear reactor units, three nuclear reactor units, four nuclear reactor units (also illustrated), five nuclear reactor units, six nuclear reactor units, or so forth.

The remainder of the nuclear power plant is not illustrated in FIG. 1. In a typical configuration, the steam output by the steam generator 18 of each PWR 1 (or output by a BWR directly) drives a steam turbine that in turn drives an electric generator that feeds an external electrical power grid through various electrical power lines, transformers, or so forth. The nuclear power plant also includes auxiliary systems such as an emergency core cooling (ECC) system, a reactor coolant system (RCS, including the primary coolant inside the pressure vessel 2 along with the pressurizer 16, 17 and other ancillary components), a reactor coolant inventory/purification system (RCIPS), various house electrical systems, backup electrical power (e.g. diesel generators and/or batteries), various cooling/chilled water systems, makeup water supplies, and so forth. Again, these components are not shown in FIG. 1. Some of these systems are dedicated to a single reactor unit 1—for example, there is a separate turbine/generator system for each reactor unit 1. On the other hand, some of these systems are shared in common by both SMR #1 and SMR #2.

Figure 2:
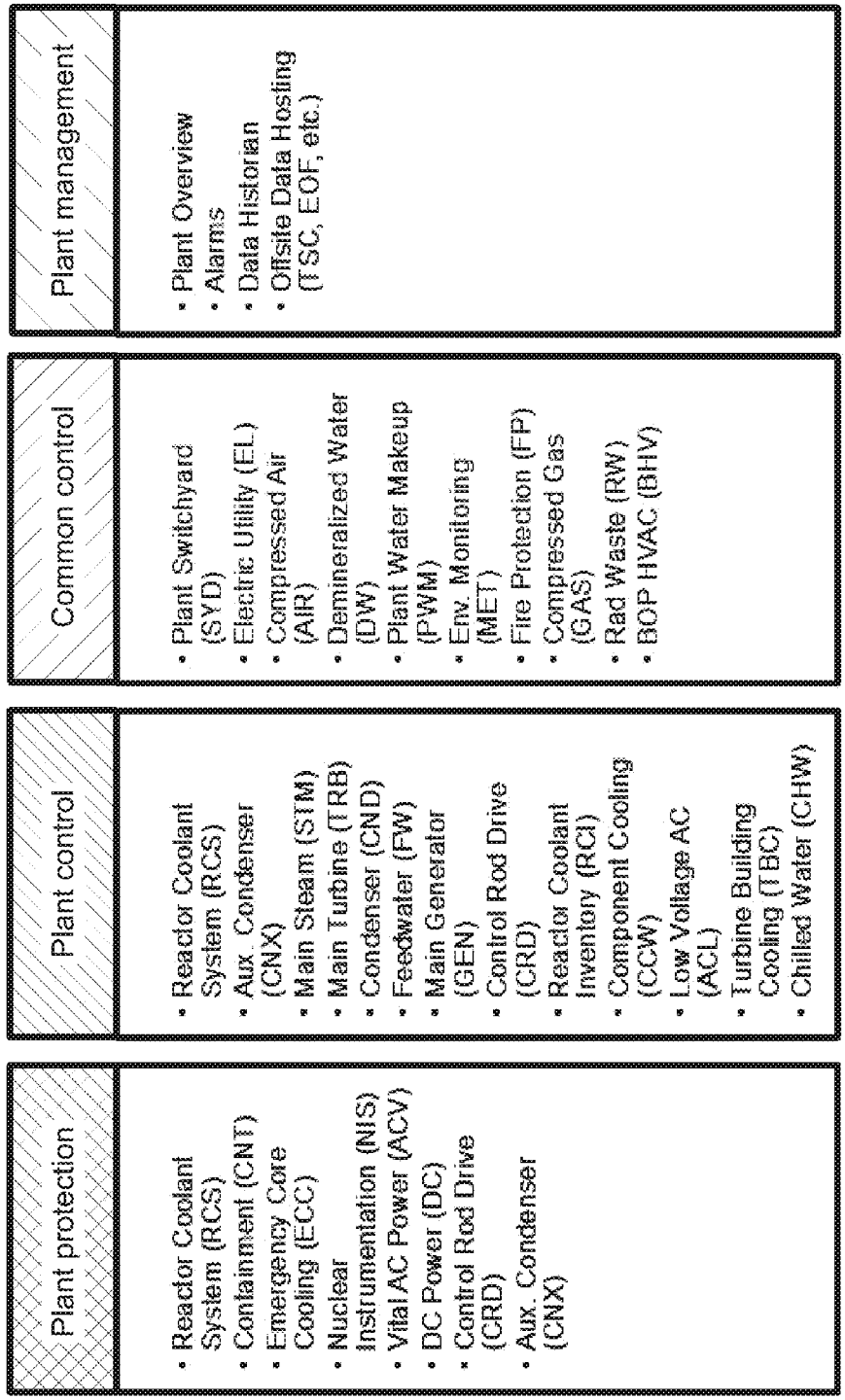
FIG. 2 shows a table categorizing principal systems of the nuclear power plant of FIG. 1 into categories including: "Plant Protection" systems, "Plant Control" systems, "Common Control" systems, and "Plant Management" systems.

With reference to FIG. 2, some principal systems of the nuclear power plant of FIG. 1 are listed. In FIG. 2, these systems are categorized as: "Plant Protection" systems, "Plant Control" systems, "Common Control" systems, or "Plant Management" systems. The "Plant Protection" and "Plant Control" systems are dedicated to a single reactor unit—in other words, for the illustrative two-pack plant there are two instances of each of these systems, one servicing SMR #1 and the other servicing SMR #2. (By extension, in a four-pack plant there would be four instances of such systems, and so forth). The "Common control" and "Plant management" systems are typically (although not necessarily) shared between SMR #1 and SMR #2 —in other words, there typically is a single instance of each of these systems, which services both reactor units SMR #1 and SMR #2. As will be discussed, however, the "Common control" systems can be defined on a basis of a minimum time interval before the OATC must address a failure in a system of the "Common control" category.

It will be noticed that there is some overlap between the "Plant Protection" and "Plant Control" systems—for example, the Reactor Coolant System (RCS) is listed under both "Plant Protection" and "Plant Control". These dual-listed systems provide both plant control and plant protection functions. The RCS, for example, performs a plant control function in that control of primary coolant pressure and temperature is used to adjust the thermal power generated by the reactor unit during normal operation; additionally, however, the RCS serves a plant protection function in that it absorbs heat from the nuclear reactor core and transfers it to the steam generator (in the illustrative case of a PWR; alternatively, in a BWR the primary coolant directly boils and conducts heat away as primary coolant steam).

Most systems listed in FIG. 2 are well known systems that are commonly present in existing nuclear power plants. The listed auxiliary condenser (CNX), however, is a non-standard component contemplated for inclusion in the B&W mPower™ small modular reactor design. This auxiliary condenser is located outside containment (e.g., a roof-mounted condenser) and is air-cooled by battery-operated fans. The auxiliary condenser is connected with the steam generator 18, which is internal to the pressure vessel in the mPower™ design (i.e., an integral PWR), so that it provides passive cooling using secondary coolant trapped in the steam generator when main feedwater and steam line valves are shut. The CNX is usable in a protective role, for example coming on-line to dissipate heat if the RCS temperature exceeds a safety threshold. The CNX is also usable in a plant control role, for example providing more rapid cool down during reactor shutdown for refueling. Accordingly, the CNX is listed under both "Plant Protection" and "Plant Control" categories.

The categorization of systems shown in FIG. 2 is not merely pedagogic—rather, these system categories are used in the design of the disclosed control room embodiments. It is recognized herein that those systems that are shared between SMR #1 and SMR #2 (or more generally, that are shared between two or more nuclear reactor units) are not of a safety-critical nature. For example, the regulatory framework of the NRC requires that safety-critical systems not be shared amongst nuclear reactor units unless it can be shown that the sharing does not significantly impair their ability to perform their safety functions including, in the event of an accident in one unit, shutdown and cool down of the remaining units. Thus, any system that is shared between SMR #1 and SMR #2 (or, more generally, that is shared between two or more reactor units) is suitably categorized as a "Common Control" or "Plant Management" system. The "Common Control" and "Plant Management" systems do not need to be under the control of the OATC, and the "Plant Management" systems are generally monitoring-only systems (without control capability).

The "Common control" category can be expanded to encompass some systems that are reactor unit specific. For example, consider the plant water make-up (PWM) system, which is listed in the "Common Control" category. Loss of this system does not pose an immediate safety concern requiring action by the OATC of either SMR #1 or SMR #2, because the reactor coolant inventor (RCI) contains sufficient purified water for maintaining the primary coolant level in the reactor vessel 2 for some minimum time interval. (Appropriately, the RCI is listed under the "Plant Control" category and is supervised by the OATC.) However, if the plant make-up water system remains unavailable for an extended period of time, then eventually both SMR #1 and SMR #2 will need to be shut down. In view of this, nuclear regulations generally allow the PWM system to be shared amongst two (and possibly more) reactor units.

But, these observations remain true even if the PWM system is segregated into separate PWM systems for SMR #1 and SMR #2. The principled rationale for placing the PWM system under the "Common control" category is not that it is shared between SMR #1 and SMR #2 —rather, the principled rationale for this categorization is that any failure of the PWM system does not need to be addressed by the OATC for some minimum time interval.

Accordingly, in some embodiments the basis for categorizing a system in the "Common control" category is as follows: Any failure of the system does not require attention of the OATC for at least a minimum time interval $T_{CC}$. It will be readily recognized that decreasing $T_{CC}$ allows more systems to be classified in the "Common control" category. However, decreasing $T_{CC}$ also means that a failure of a "Common control" system may require OATC intervention more quickly. In some embodiments, a time interval of one hour is used (i.e. $T_{CC}$=1 hour), and this criterion was used in generating the categorization shown in FIG. 2. By setting the minimum time interval $T_{CC}$ to a value greater than or equal to one hour, it is generally assured that the OATC will not need to intervene in typical events which can be handled by the NLO. In view of the foregoing, the "Common Control" category is sometimes referred to herein as the "Non-safety Control" category.

In view of the foregoing, the disclosed control room embodiments assign the systems in the "Plant Protection" and "Plant Control" categories to the OATC, while systems in the "Common Control" category are assigned to a different plant operator. Conditional upon approval by the governing nuclear regulatory agency, the plant operator in charge of the "Common Control" systems can be a non-licensed operator (NLO), although it is contemplated to employ a licensed operator for these tasks (e.g., to conform with regulations, if applicable, and/or to provide an additional licensed operator on-site for redundancy purposes). Systems under the "Plant Management" category are plant supervisory monitoring tasks that fall under control of the SRO.

The disclosed control room embodiments are also designed to enhance communications between operators. It is useful for the OATC of the (illustrative) two SMR units, the SRO, and the other plant operators to be in efficient communication with one another. In existing nuclear power plants, such communication is adversely impacted by physical separation of the plant operators. The OATC is necessarily stationed in the control room. However, conventionally the SRO is stationed elsewhere, for example in a plant supervisor's office. The various other plant operators are distributed through the plant, performing various functions. Communication via telephone is helpful, but telephonic communication limits the ability of the SRO to oversee safety-critical functions performed by the OATC. The SRO can travel to the control room to personally oversee operations when appropriate, but this requires travel time, and does not address the possibility that the OATC may fail to recognize a problem that the SRO might have recognized if present. Similarly, telephonic communication of the SRO and/or OATC with other plant operators is less than ideal.

Figure 3:
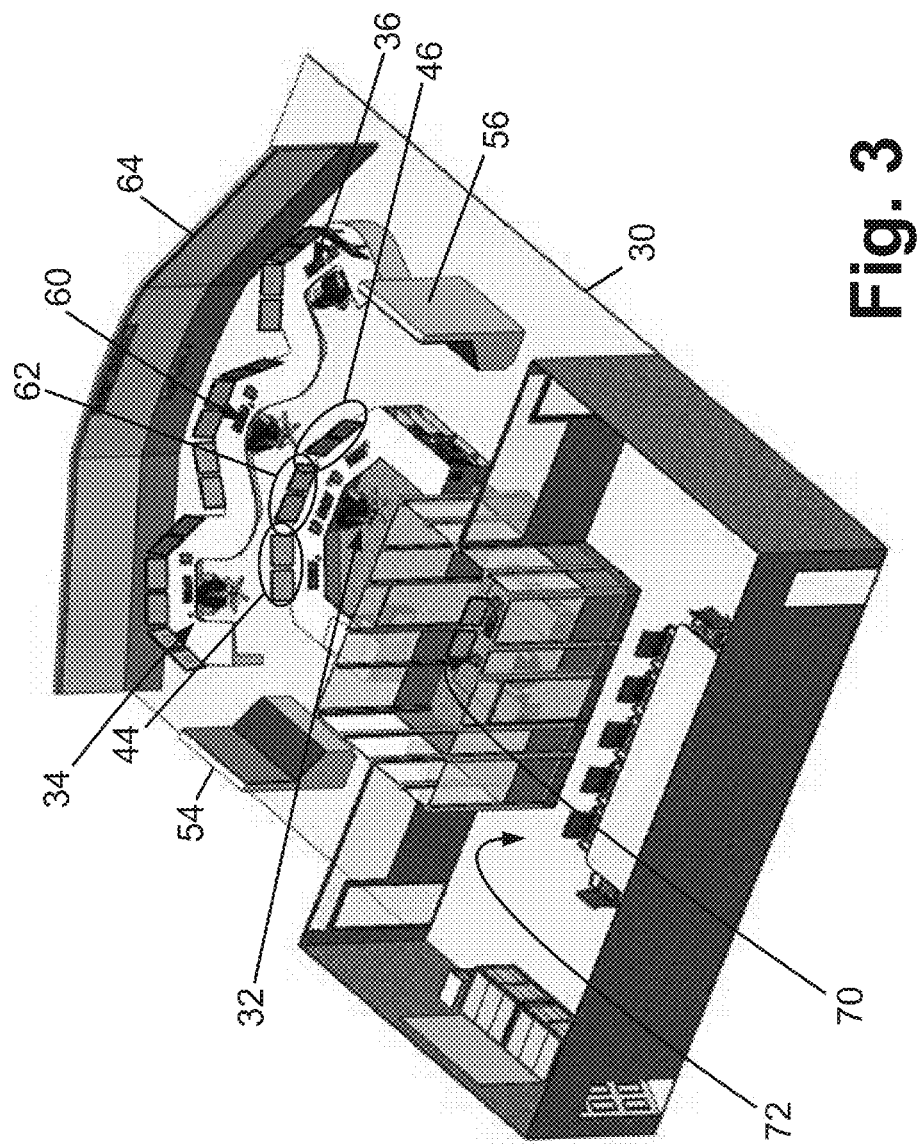
FIG. 3 shows an enlarged perspective view of the control room of the nuclear power plant of FIG. 1.

With continuing reference to FIGS. 1 and 2 and with further reference to FIG. 3, the OATC for both SMR #1 and SMR #2, as well as the SRO and a senior non-licensed operator (NLO), are all stationed in a control room 30. For illustrative purposes, the walls and ceiling of the control room 30, as well as the containing building, are omitted to reveal the operator stations and principle human-machine interface (HMI) components. It is to be understood that the control room 30 may be housed in the same reactor service building that houses the reactor units 1, or may be housed in a nearby (e.g. adjacent) building.

The control room 30 includes a centrally located SRO station 32 (i.e. a central workstation 32) where the SRO is stationed. The SRO station 32 provides monitoring capability for both SMR #1 and SMR #2, and additionally provides monitoring capability for the supervisory monitoring tasks that fall under the "Plant management" category. In some embodiments the SRO station 32 does not provide any control capability for either SMR #1 or SMR #2. In front and to one side (left, in the illustrative example) of the SRO station 32 is a first OATC station 34 where the OATC in charge of SMR #1 is stationed. In front and to the other side (right, in the illustrative example) of the SRO station 32 is a second OATC station 36 where the OATC in charge of SMR #2 is stationed. The OATC stations 34, 36 provide both monitoring and control functions for their respective SMR units. Advantageously, the SRO is stationed in the same control room 30 as the OATCs, and so the SRO and the OATCs can communicate directly, and not via telephone or other intervening hardware. Placement of the OATC stations 34, 36 in front of and to either side of the SRO station 32 facilitates the SRO in supervising the OATCs. The SRO station 32 includes a first one or more video display units (VDUs) 44 on the left side of the station that display monitoring data for SMR #1 also viewed by the OATC at the first OATC station 34. Similarly, the SRO station 32 includes a second one or more VDUs 46 on the right side of the station that display monitoring data for SMR #2 also viewed by the OATC at the second OATC station 36. This corresponding spatial arrangement (i.e., both the OATC station 34 and the monitoring VDUs 44 for SMR #1 on the left; and both the OATC station 36 and the monitoring VDUs 46 for SMR #2 on the right) immediately informs the SRO as to which SMR unit is being observed. Again, the VDUs 44, 46 in some embodiments provide only monitoring capabilities, but not control. On the other hand, the VDUs of the first OATC station 34 provide both monitoring and control capabilities for SMR #1, and similarly the VDUs of the second OATC station 36 provide both monitoring and control capabilities for SMR #2. In some embodiments, the VDUs 44, 46 at the SRO station 32 mirror one or more of the VDUs of the corresponding OATC station 34, 36, and optionally the SRO can select by suitable graphical user interface (GUI) input operations which VDU displays are mirrored.

In the illustrative embodiment, monitoring and control employs a digital interface with the VDUs providing the human-machine interface (HMI) for monitoring and (in the case of OATC stations 34, 36) control functionality. For example, the monitoring and control may implemented as a central computer (not shown) accessed via the VDUs. Alternatively, each VDU (or some VDUs) can be implemented as desktop computers interconnected by a digital data network. From a safety standpoint, this can be problematic since digital controls are intangible—they do not include tangible switches, buttons, dials, and so forth having dedicated functions. Instead, a VDU displays what it is programmed to display, and provides input controls (e.g., GUI controls) in accord with the digital programming. If there is a failure in such a control system, it can be difficult to diagnose and remediate. Accordingly, the control room 30 includes a manual safety panel (MSP) 54 for SMR #1 off to the one side (e.g. left) of the SRO station 32, and similarly includes an MSP 56 for SMR #2 off to the other side (e.g. right) of the SRO station 32. The MSPs 54, 56 provide manual controls (e.g., dedicated analog buttons, switches, readout dials, annunciator lights, and so forth) for operating those systems in the "Plant Protection" category for the respective SMR unit. In some embodiments, the MSPs 54, 56 do not provide manual controls for operating those systems that are (only) in the "Plant Control" category, although it is contemplated to provide manual control for some such "Plant Control" only systems via the MSPs. Again, placement of the MSPs 54, 56 at either side of the SRO station 32 provides a natural mnemonic link to the appropriate SMR unit, and also places the MSPs 54, 56 in locations that are readily accessed by either the SRO (who is a licensed plant operator) or the OATC for that SMR unit.

The systems in the "Common control" category can be performed by a non-licensed operator (NLO), conditional on authorization by the NRC or other governing nuclear regulatory agency) or by a licensed operator. In the following a NLO is assumed to be in charge of the systems of the "Common control" category. In the control room 30, this NLO is stationed at a NLO station 60 (also referred to herein as a common control station 60 or "Non-safety Control" station 60) located between the OATC stations 34, 36. This placement provides a mnemonic reminder that the functions performed at the NLO station 60 (at least generally) apply to both SMR #1 and SMR #2 (although as noted previously, in some embodiments some systems of the "common control" category may be specific to individual SMR units). One or more additional VDUs 62 at the SRO station 32 may enable the SRO to monitor activities at the NLO station 60. (In some embodiments, these VDUs 62 may be switchable to provide additional VDUs for monitoring activities at one or both OATC stations 34, 36). The NLO station 60 provides both monitoring and control capabilities, but only for the systems of the "Common control" category.

The illustrative control room 30 further optionally includes vertical panels 64 that may include various monitoring devices, e.g. VDUs, analog dials, annunciators, or so forth. The vertical panels 64 provide a larger area that may, for example, be used to display a more detailed system mimic than can be shown on the smaller VDUs of the various stations 32, 34, 36, 60. The vertical panels 64 are arranged in an arc that is viewable (at least in part) from any of the various stations 32, 34, 36, 60. Preferably, the vertical panels 64 provide monitoring displays, but not control inputs. However, it is contemplated to include some controls (preferably redundant) on the vertical panels 64. As another variant, it is contemplated to integrate the MSPs 54, 56 as part of the vertical panels 64, e.g. at the left and right sides to maintain the mnemonic arrangement.

Figure 4:
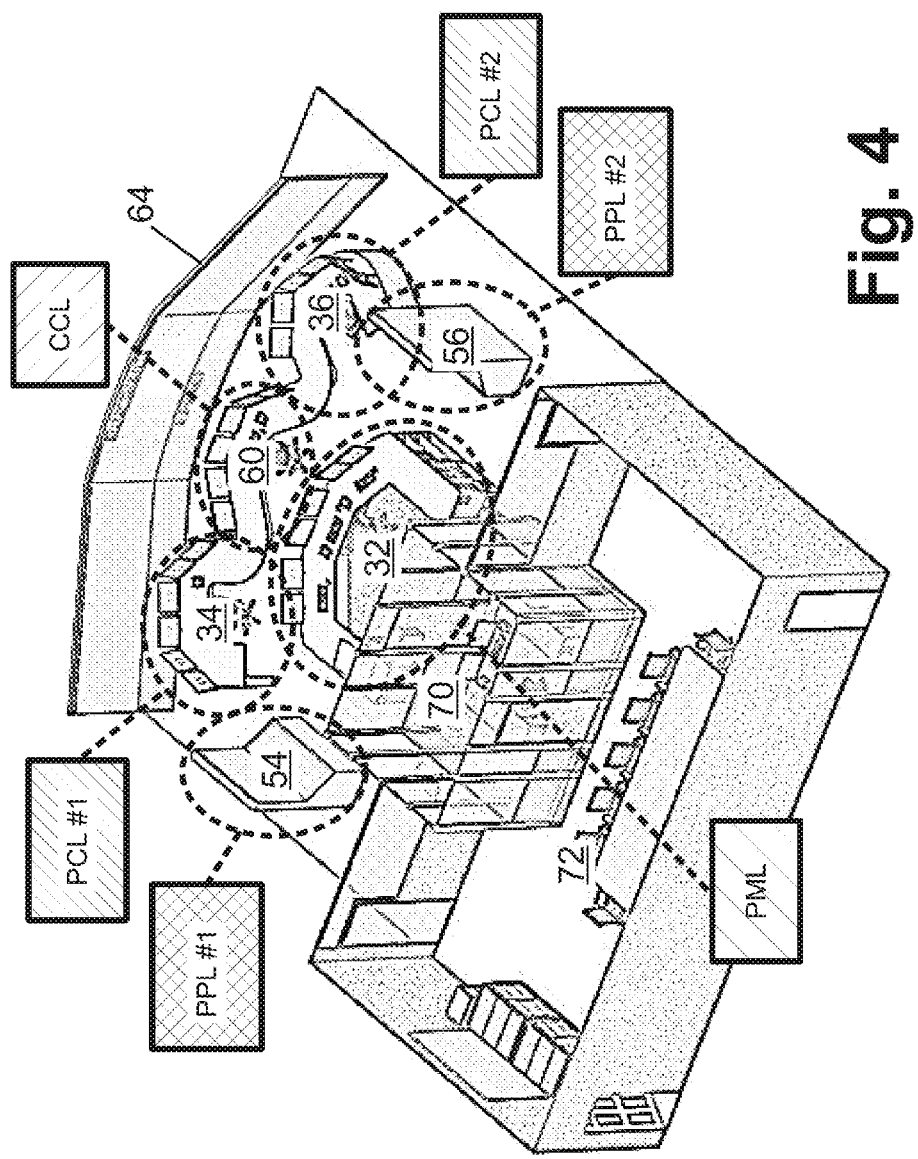
FIG. 4 shows the enlarged perspective view of the control room of FIG. 3 with various components associated with various system categories set forth in FIG. 2.

With brief reference to FIG. 4, allocation of control functions amongst the stations 32, 34, 36, 60 and the MSPs 54, 56 are diagrammatically shown. In FIG. 4 the acronyms are as follows: PPL=Plant Protection Layer (i.e., systems of the "Plant Protection" category); PCL=Plant Control Layer (i.e., systems of the "Plant Control" category); CCL=Common Control Layer (i.e., systems of the "Common Control" category); and PML=Plant Management Layer (i.e., supervisory systems of the "Plant Management" category). Although the OATC stations 34, 36 are indicated in FIG. 4 as performing functions of the "Plant Control" category, the OATC stations 34, 36 are also capable of performing functions of the "Plant Protection" category. On the other hand, the MSPs 54, 56 are principally intended to perform functions of the "Plant Protection" category, and only incidentially may also be designed to provide some plant control functionality. The SRO station 32 is indicated as providing HMI for the systems of the "Plant management" category; however, it is to be understood that (1) the "Plant management" category typically includes only monitoring (not control) functions, and (2) the SRO station 32 also can also monitor (but not control) systems under the "Plant protection", "Plant control", and "Common control" categories.

With reference back to FIG. 3, placing the SRO station 32 inside the control room 30 advantageously enhances the ability of the SRO to monitor and communicate with the OATCs and with the NLO in charge of the systems of the "Common control" category. However, the SRO also has other duties, including management of all aspects of the nuclear power plant, including business aspects unrelated to the technical matters of daily operation of SMR #1 and SMR #2. To accommodate the SRO in performing these tasks, the control room 30 optionally also includes an enclosed office 70 for use by the SRO. The office 70 can be a completely walled office, or can be a cubicle with walls that do not extend to the ceiling (not shown) of the control room 30. The walls of the office 70 are preferably transparent (e.g., glass, plexiglass, et cetera) at least for those walls facing the operator stations 32, 34, 36, 60, so that the SRO can continue to monitor plant operators while performing office tasks. Optionally, the control room 30 further includes a meeting room 72, which can be used by the SRO or others to conduct business meetings. The optional meeting room 72 and/or office 70 also provides a convenient "observation deck" from which visitors to the nuclear power plant can view operation of the control room 30 without impeding the OATCs and NLO in the performance of their duties.

With brief reference back to FIG. 1, in illustrating the layout of the control room 30, for convenience SMR #1 is shown on the left of the SRO station 32 and SMR #2 is shown on the right of the SRO station 32. However, the mnemonic reference value of this physical placement of the SMR units is generally not useful since the control room 30 typically does not include windows through which plant operators in the control room 30 can see the physical SMR units. Accordingly, the placement of SMR #1 and SMR #2 as shown in FIG. 1 is not of especial value. Nonetheless, in some embodiments the illustrated placement of SMR #1 and SMR #2 may be followed in the physical plant layout, which may be useful since the plant operators are expected to have the physical layout of the nuclear power plant memorized.

Figure 5:
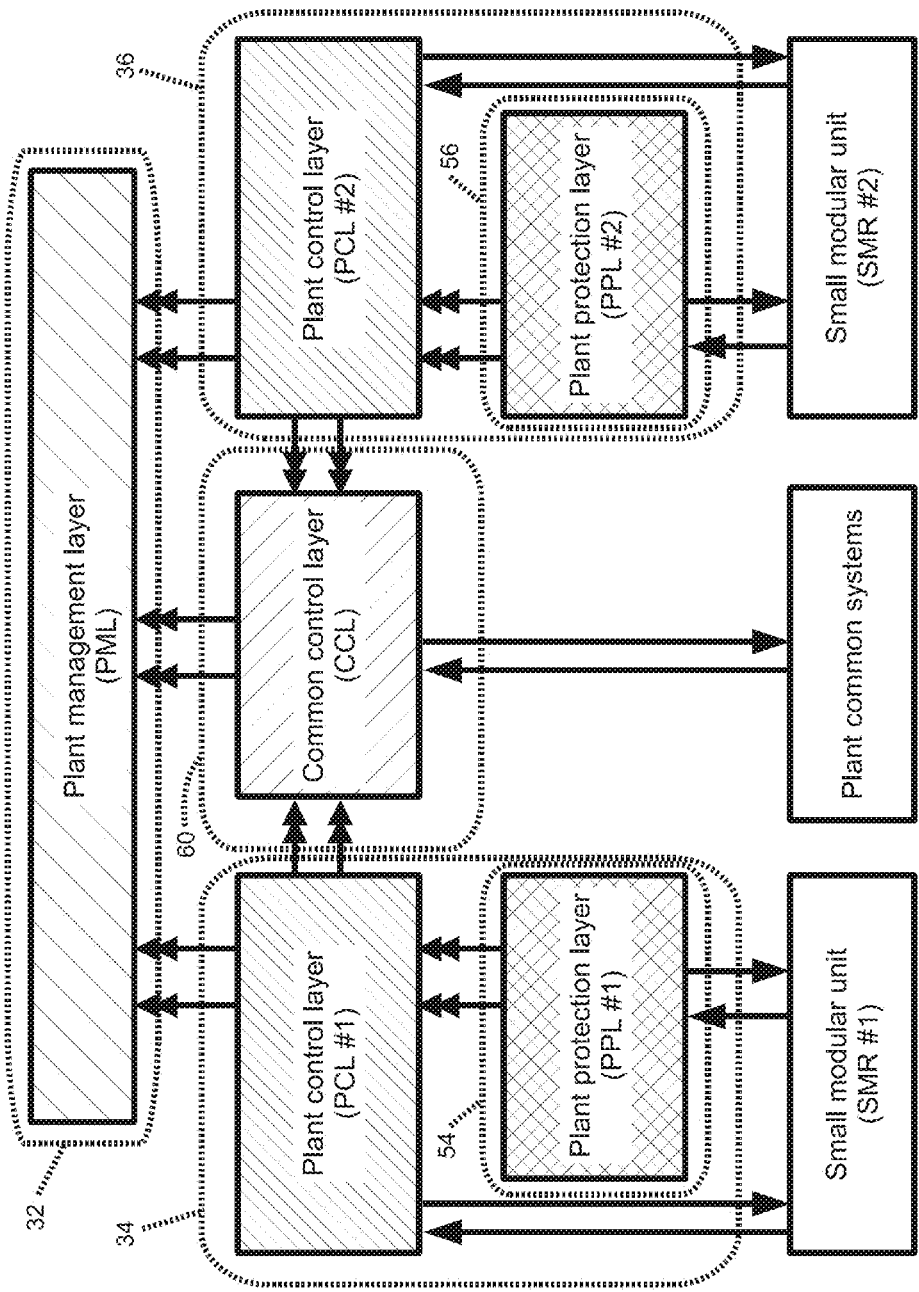
FIG. 5 diagrammatically shows the data network of the control room of FIGS. 1, 3, and 4 including data network communication with the first and second nuclear reactor units shown in FIG. 1.

With reference to FIG. 5, the data network of the control room 30 is diagrammatically shown, including arrows indicating data flow. In FIG. 5, double-headed arrows indicate unidirectional data flow (i.e. data flow in one direction only). In the illustrative data network of FIG. 5, the Plant Management Layer (corresponding to the SRO station 32 and the supervisory systems of the "Plant Management" category) is monitoring-only, as indicated in FIG. 5 by double-headed arrows feeding into (but not out of) the Plant Management Layer. The Common Control Layer corresponding to the NLO station 60 may be able to monitor activities of the systems of the Plant Control Layer and Plant Protection Layer, but cannot control those systems. The Common Control Layer does have both monitoring and control capability with respect to the plant common systems of the Common Control category.

As further seen in FIG. 5, both the Plant Protection Layer #1 and the Plant Control Layer #1 have both monitoring and control capability respective to SMR #1, and similarly both the Plant Protection Layer #2 and the Plant Control Layer #2 have both monitoring and control capability respective to SMR #2. The Plant Control Layer of each SMR unit can monitor the Plant Protection Layer of that SMR unit; however, the converse is not true, i.e. the Plant Protection Layer cannot monitor the Plant Control Layer. This is because the Plant Protection Layer operates in a response mode—i.e., when a particular safety alarm is tripped, the Plant Protection Layer responds by performing a designated safety response. In this operation, the Plant Protection Layer does not need to know the current state of the plant control operation. It will be further noted in FIG. 5 that the OATC station 34 provides a HMI for both Plant Protection Layer #1 and Plant Control Layer #1, whereas the MSP 54 provides HMI only for the Plant Protection Layer #1 (although it is contemplated to provide some Plant Control Layer HMI capability at the HMI). In the same way, the OATC station 36 provides a HMI for both Plant Protection Layer #2 and Plant Control Layer #2, whereas the MSP 56 provides HMI only for the Plant Protection Layer #2.

In the illustrative embodiment, the OATC workstations 34, 36 are located in front of and to the side of the Central SRO workstation 32 at a sufficient angle "to the side" to allow the SRO to directly observe the OATCs at the OATC stations 34, 36. In some embodiments the control room 30 is arranged with bilateral symmetry about a vertical symmetry plane passing through both the SRO station 32 and the NLO station 60, with the OATC workstation 34 and MSP 54 for SMR #1 on one side of the symmetry plane (i.e., the left side in the illustrative embodiment), and the OATC workstation 36 and MSP 56 for SMR #2 on the other side of the symmetry plane (i.e., the right side in the illustrative embodiment). This provides a physical delineation of operations between the two SMR units while centrally placing the SRO and NLO so as to be able to monitor and react to events occurring in either or both SMR units. As described, a bilaterally symmetric configuration for the control room 30 is advantageous. However, some asymmetry is contemplated, for example if SMR #1 and SMR #2 are not identical such that there are some differences between the OATC workstations 34, 36 and/or between the MSP's 54, 56.

The minimum number of operators for the control room 30 is four—one SRO, two OATCs, and one NLO. Of these, three operators (the SLO and the two OATCs) are licensed, while the NLO can be an unlicensed operator. All of these operators are stationed in the same control room 30 and can therefore communicate face-to-face with each other. Optionally, there may be additional operators, either inside or outside of the control room 30. For example, one or more mobile operators, who typically may be unlicensed operators, may be available to perform mobile tasks such as tagging system components in or out, directly visually confirming status of various components, and so forth.

Figure 6:
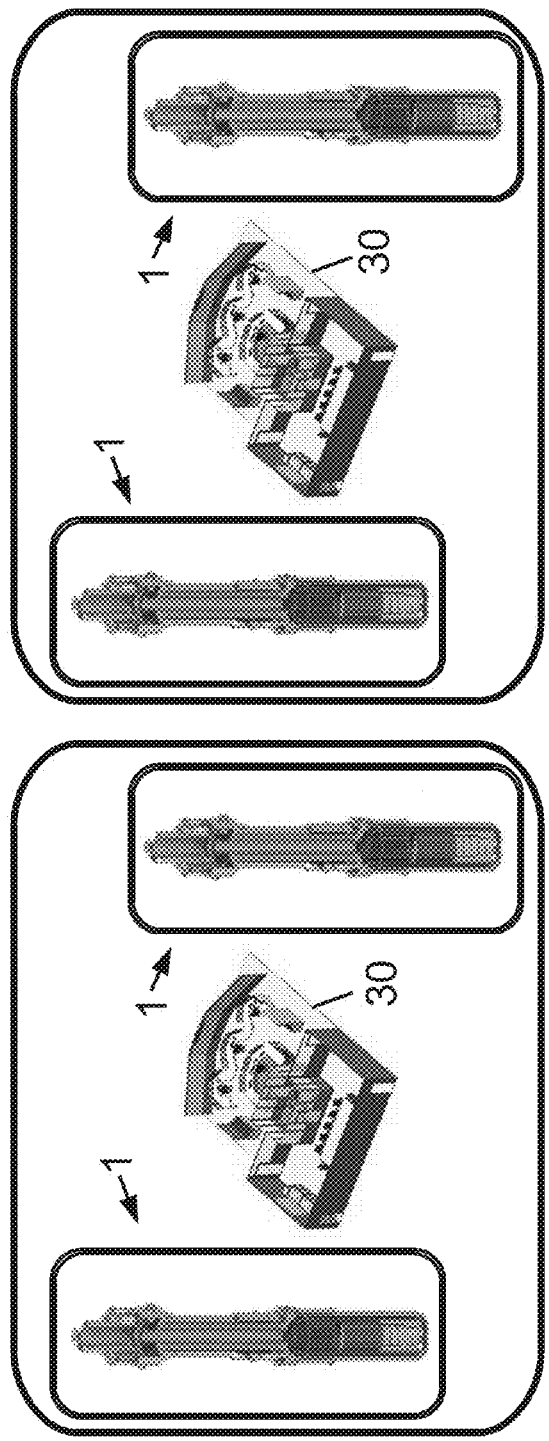

With reference to FIGS. 6 and 7, the disclosed control room embodiments are readily expanded to additional reactor units. In FIG. 6, one approach for expanding the twin-pack configuration of FIGS. 1-5 to a four-pack is illustrated. This approach simply duplicates all systems, so that there are now two control rooms 30, each controlling two SMR units 1. In this case the number of operators requires is doubled—two SROs (one for each control room 30), four OATCs (two in each control room 30), and two NLOs (one for each control room 30). In practice, an additional SRO-level operator may be needed to oversee the two control rooms 30, so that the number of operators is nine (three SROs, four OATCs, and two NLOs) of which seven operators must be licensed operators.

FIG. 7 shows an alternative control room 30' that expands the arrangement of the control room 30 to enable control of all four SMRs 1 from the single control room 30. The expansion includes adding two additional OATC stations and two additional MSPs. However, the control room 30' is still staffed by only one SRO and only one NLO, so that the total number of operators is six (one SRO, four OATCs, and one NLO). Such expansion is contemplated to be further extended in analogous fashion to five or six reactor units; however, as more reactor units are added the supervisory burden on the SRO increases, so that it is expected that no more than six reactor units can be supervised by a single SRO even using the disclosed control room.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A control room for monitoring and controlling a nuclear power plant including a first nuclear reactor unit and a second nuclear reactor unit, the control room comprising:
   a central workstation providing monitoring capability for both the first nuclear reactor unit and the second nuclear reactor unit;
   a first operator at the controls (OATC) workstation in front of and to one side of the central workstation providing monitoring and control capabilities for the first nuclear reactor unit but not for the second nuclear reactor unit;
   a second OATC workstation in front of and to the other side of the central workstation providing monitoring and control capabilities for the second nuclear reactor unit but not for the first nuclear reactor unit;
   a first manual safety panel (MSP) located to the one side of the central workstation providing safety-related monitoring information and manual controls for the first nuclear reactor unit; and
   a second MSP located to the other side of the central workstation providing safety-related monitoring information and manual controls for the second nuclear reactor unit,
   wherein the central workstation, the first OATC workstation, the second OATC workstation, the first MSP and the second MSP are disposed in the control room.

2. The control room of claim 1 wherein the central workstation does not provide control capabilities for the first nuclear reactor unit and does not provide control capabilities for the second nuclear reactor unit.

3. The control room of claim 1 further comprising:
   a common control workstation directly in front of the central workstation providing monitoring and control capabilities for systems serving both the first nuclear reactor unit and the second nuclear reactor unit;
   wherein the common control workstation is disposed in the control room with the central workstation, the first OATC workstation, and the second OATC workstation.

4. The control room of claim 3 wherein the common control workstation does not include any control capabilities that must be performed by a licensed operator.

5. The control room of claim 1 further comprising:
   a common control workstation directly in front of the central workstation providing monitoring and control capabilities for common control systems defined as systems a failure of which does not require manual intervention of an OATC for at least a minimum time interval greater than or equal to one hour.

6. The control room of claim 1 further comprising an office associated with the central workstation, the office being disposed in the control room with the central workstation, the first OATC workstation, and the second OATC workstation.

7. The control room of claim 6 further comprising a conference room, the conference room being disposed in the control room with the office, the central workstation, the first OATC workstation, and the second OATC workstation.

8. The control room of claim 1 further comprising vertical panels including monitoring displays but not control inputs, the vertical panels being disposed in the control room with the central workstation, the first OATC workstation, and the second OATC workstation.

9. A nuclear power plant comprising:
   a first nuclear reactor unit including a nuclear reactor core comprising fissile material disposed in a pressure vessel;
   a second nuclear reactor unit including a nuclear reactor core comprising fissile material disposed in a pressure vessel; and
   a control room as set forth in claim 1.

10. The nuclear power plant as set forth in claim 9, wherein there is a single control room and a single central workstation disposed in the control room.

11. A nuclear power plant comprising:
   a first nuclear reactor unit including a nuclear reactor core comprising fissile material disposed in a pressure vessel;
   a second nuclear reactor unit including a nuclear reactor core comprising fissile material disposed in a pressure vessel;
   a third nuclear reactor unit including a nuclear reactor core comprising fissile material disposed in a pressure vessel;
   a fourth nuclear reactor unit including a nuclear reactor core comprising fissile material disposed in a pressure vessel; and
   a control room as set forth in claim 1, wherein the control room further includes:
   a third OATC workstation in front of and to the one side of the central workstation providing monitoring and control capabilities for the third nuclear reactor unit but not for the first, second, or fourth nuclear reactor units; and
   a fourth OATC workstation in front of and to the other side of the central workstation providing monitoring and control capabilities for the fourth nuclear reactor unit but not for the first, second, or third nuclear reactor units;
   wherein the central workstation, the first OATC workstation, the second OATC workstation, the third OATC workstation, and the fourth OATC workstation are disposed in the control room.

* * * * *